United States Patent [19]
Shinada et al.

[11] Patent Number: 5,343,383
[45] Date of Patent: Aug. 30, 1994

[54] RECTIFIER FOR DC/DC CONVERTER

[75] Inventors: Yohsuke Shinada; Hidetake Nakamura, both of Tokyo, Japan

[73] Assignee: NEC Corporation, Tokyo, Japan

[21] Appl. No.: 26,695

[22] Filed: Mar. 5, 1993

[30] Foreign Application Priority Data

Mar. 5, 1992 [JP] Japan .................. 4-083203

[51] Int. Cl.⁵ ........................... H02M 7/217
[52] U.S. Cl. .......................... 363/127; 363/15
[58] Field of Search ............. 363/15, 16, 84, 89, 363/127

[56] References Cited

U.S. PATENT DOCUMENTS

| | | | |
|---|---|---|---|
| 4,737,902 | 4/1988 | Nakao et al. | 363/127 |
| 5,144,547 | 9/1992 | Masamoto | 363/127 |
| 5,179,512 | 1/1993 | Fisher et al. | 363/127 |

OTHER PUBLICATIONS

Namiki et al., "Proceedings of the 1991 IEICE Fall Conference" Published by the Institute of Electronics, Information and Communication Engineers, Sep. 1991.

*Primary Examiner*—Jeffrey L. Sterrett
*Attorney, Agent, or Firm*—Foley & Lardner

[57] ABSTRACT

A rectifier for a DC/DC converter includes first and second FETs, first and second capacitors, and first and second resistors. The first FET is connected in series with the secondary winding of a main transformer of the DC/DC converter. The second FET is connected in parallel with the series circuit constituted by the secondary winding of the main transformer and the first FET. The first and second capacitors are respectively connected between the gate of the first FET and the drain of the second FET and between the gate of the second FET and the drain of the first FET. The first and second resistors are respectively connected between the gate and source of the first FET and between the gate and source of the second FET.

4 Claims, 3 Drawing Sheets

RECTIFIER FOR DC/DC CONVERTER

BACKGROUND OF THE INVENTION

The present invention relates to a rectifier for a DC/DC converter and, more particularly, to a synchronous rectifier using a MOSFET instead of a rectifying diode.

A conventional MOSFET rectifier for a DC/DC converter constituting a forward converter is disclosed in "Effect of Gate Resistance on the Efficiency of the MOSFET Synchronous Rectifier" in B-532 of Proceedings of the 1991 IEICE Fall Conference, (September, 1991). As shown in FIG. 5, in this rectifier, a rectifying n-channel MOSFET (to be referred to as a rectifying FET hereinafter) 4 is connected in series with a secondary winding 2b of a main transformer 2, and the series circuit constituted by the secondary winding 2i b of the main transformer 2 and the rectifying FET 4 is connected in parallel with a commutating n-channel MOSFET (to be referred to as a commutating FET hereinafter) 9. The source of the rectifying FET 4 is connected to the source of the commutating FET 9. The gate of the rectifying FET 4 is connected to the drain of the commutating FET 9 through a gate resistor 16. The gate of the commutating FET 9 is connected to the drain of the rectifying FET 4 through a gate resistor 17. A filter circuit constituted by a choke coil 14 and a capacitor 15 is connected to the output of the converter. Referring to FIG. 5, reference numeral 1 denotes an input filter circuit connected to the input of a primary winding 2a of the main transformer 2; 3, a main switch connected in series with the primary winding 2a of the main transformer 2; 5, a parasitic diode of the rectifying FET 4; 6, an input capacitor of the rectifying FET 4; 10, a parasitic diode of the commutating FET 9; and 11, an input capacitor of the commutating FET 9.

An operation of this conventional circuit will be described next. When the main switch 3 is turned on, and a switching current flows in the primary winding 2a of the main transformer 2 through the input filter circuit 1, a voltage is induced in the secondary winding 2b of the main transformer 2. As a result, a charge current of the input capacitor 6 flows through a loop constituted by the secondary winding 2b of the main transformer 2, the gate resistor 16, the input capacitor 6 of the rectifying FET 4, the parasitic diode 5 of the rectifying FET 4, and the secondary winding 2b of the main transformer 2. With this operation, when the gate potential of the rectifying FET 4 increases, with respect to the source potential (secondary side GND), to a threshold potential or more in a period of time determined by the time constant of the resistor 16 and the input capacitor 6, the rectifying FET 4 is turned on.

When the rectifying FET 4 is turned on, a discharge current of the input capacitor 11 flows through a loop constituted by the input capacitor 11, the gate resistor 17, the rectifying FET 4, and the input capacitor 11. When the gate potential of the commutating FET 9 decreases, with respect to the source potential (secondary side GND), to a threshold potential or less in a period of time determined by the time constant of the gate resistor 17 and the input capacitor 11, the commutating FET 9 is turned off. At this time, a load current flows through a loop constituted by the secondary winding 2b of the main transformer 2, the choke coil 14, the load (not shown) of the converter, the rectifying FET 4, and the secondary winding 2b of the main transformer 2.

When the main switch 3 is turned off, a flyback voltage is generated in the secondary winding 2b of the main transformer 2 as the switching current flowing in the primary winding 2a of the main transformer 2 is cut off. Consequently, with a reverse operation to that performed when the main switch 3 is turned on, a charge current flows in the input capacitor 11 through the parasitic diode 10 to turn on the commutating FET 9. A discharge current from the input capacitor 6 then flows via the rectifying FET 4 to turn off the rectifying FET 4. As a result, a load current flows through a loop constituted by the choke coil 14, the load (not shown) of the converter, the commutating FET 9, and the choke coil 14.

In this conventional MOSFET rectifier for a DC/DC converter, however, the operations of the rectifying FET 4 and the commutating FET 9 are delayed with respect to the operation of the main switch 3 owing to the time constants of the gate resistors 16 and 17 and the input capacitors 6 and 11 of the FETs 4 and 9. As the ON timings of the rectifying FET 4 and the commutating FET 9 upon switching of the main switch 3 are delayed, the recovery loss due to an increase in the ON time of each of the parasitic diodes 5 and 10 of the FETs 4 and 9 is increased. On the other hand, as the OFF timings of the rectifying FET 4 and the commutating FET 9 upon switching of the main switch 3 are delayed, the short-circuit time of the secondary winding 2b of the main transformer 2 is prolonged, resulting in a great reduction in efficiency.

SUMMARY OF THE INVENTION

It is an object of the present invention to provide a rectifier for a DC/DC converter, in which the conversion efficiency is improved.

A rectifier for a DC/DC converter, comprising a first FET connected in series with a secondary winding of a main transformer of the DC/DC converter, a second FET connected in parallel with a series circuit constituted by the secondary winding of the main transformer and the first FET, first and second capacitors respectively connected between a gate of the first FET and a drain of the second FET and between a gate of the second FET and a drain of the first FET, and first and second resistors respectively connected between the gate and source of the first FET and between the gate and source of the second FET.

DESCRIPTION OF THE PREFERRED EMBODIMENTS

Figure 1:
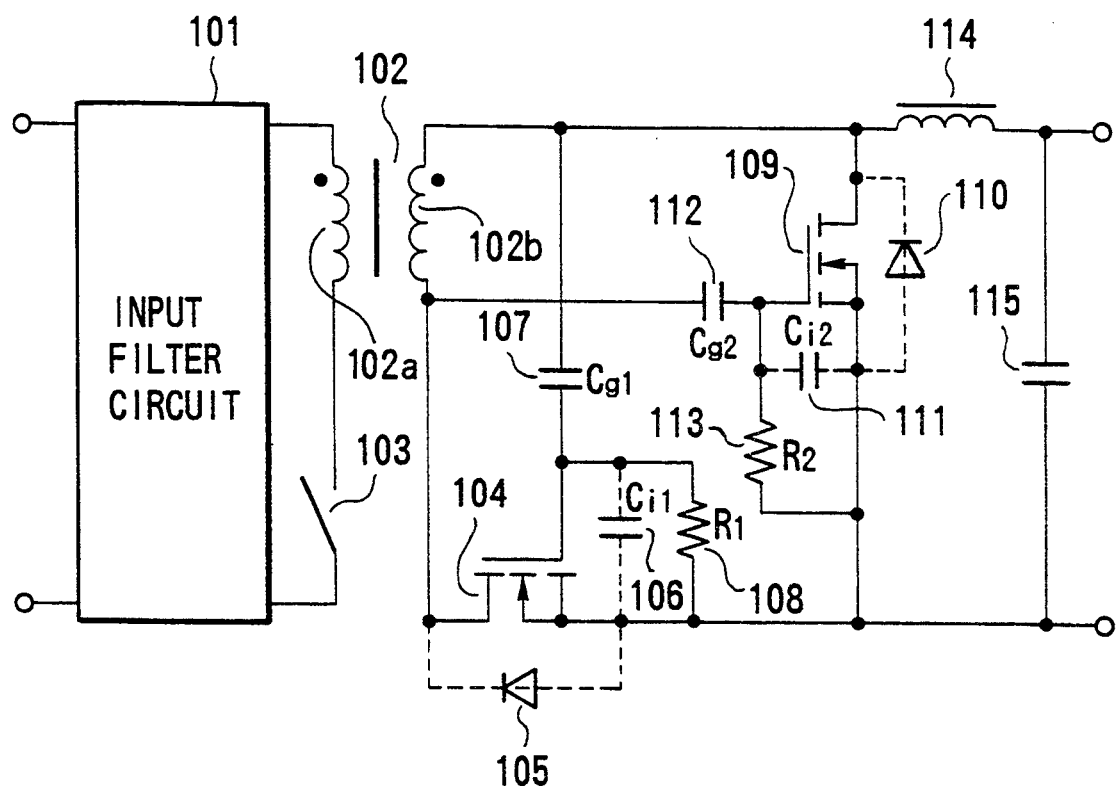
FIG. 1 is a circuit diagram of a rectifier for a DC/DC converter according to an embodiment of the present invention.

The present invention will be described below with reference to the accompanying drawings. FIG. 1 shows a rectifier for a DC/DC converter according to an embodiment of the present invention. Referring to FIG. 1, a rectifying n-channel MOSFET (to be referred to as a rectifying FET hereinafter) 104 is connected in series with a secondary winding 102b of a main transformer 102 of the DC/DC converter. A commutating n-channel MOSFET (to be referred to as a commutating FET) 109 is connected in parallel with the series circuit constituted by the secondary winding 102b of the main transformer 102 and the rectifying FET 104. The source of the rectifying FET 104 is connected to the source of the commutating FET 109. The gate of the rectifying FET 104 is connected to the drain of the commutating FET 109 through a gate capacitor 107. A resistor 108 is connected between the gate and source of the rectifying FET 104. The gate of the commutating FET 109 is connected to the drain of the rectifying FET 104 through a gate capacitor 112. A resistor 113 is connected between the gate and source of the commutating FET 109. A filter circuit constituted by a choke coil 114 and a capacitor 115 is connected to the output of the converter. Referring to FIG. 1, reference numeral 101 denotes an input filter circuit connected to the input of a primary winding 102a of the main transformer 102; 103, a main switch constituted by, e.g., an FET and connected in series with the primary winding 102a of the main transformer 102; 105, a parasitic diode of the rectifying FET 104; 106, an input capacitor of the rectifying FET 104; 110, a parasitic diode of the commutating FET 109; and 111, an input capacitor of the commutating FET 109.

Figure 5:
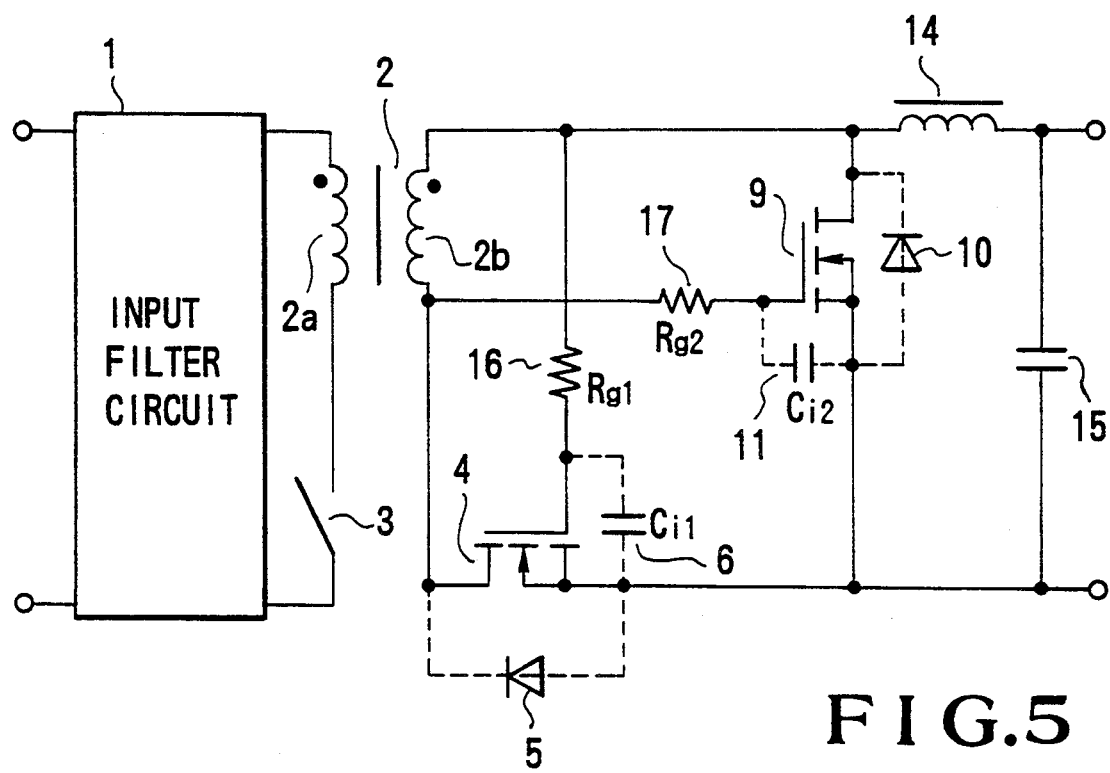
FIG. 5 is a circuit diagram of a conventional rectifier for a forward converter.

This embodiment is different from the prior art shown in FIG. 5 in that the gate capacitors 107 and 112 are used in place of the gate resistors 16 and 17, and the resistors 108 and 113 are respectively connected between the gate and source of the rectifying FET 104 and between the gate and source of the commutating FET 109.

Figure 2A:
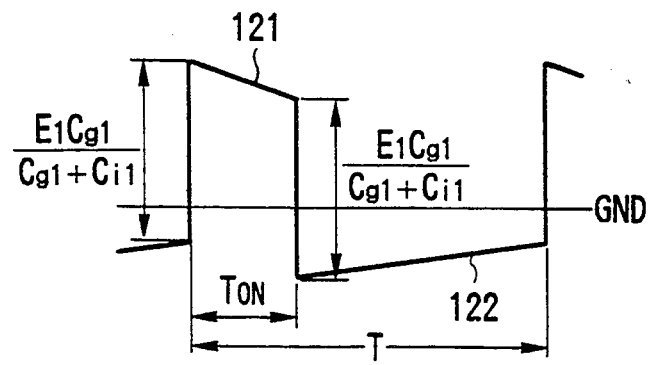
FIG. 2A is a chart showing the waveform of the gate-source voltage of a rectifying FET in FIG. 1.
Figure 2B:
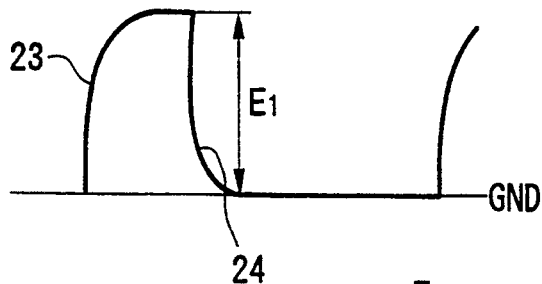
FIG. 2B is a chart showing the waveform of the gate-source voltage of a conventional rectifying FET.
Figure 3A:
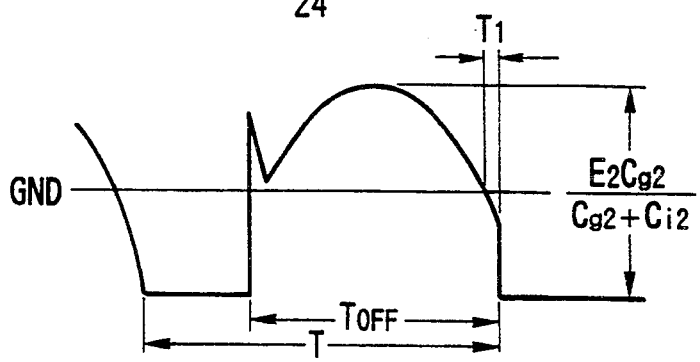
FIG. 3A is a chart showing the waveform of the gate-source voltage of a commutating FET in FIG. 1.
Figure 3B:
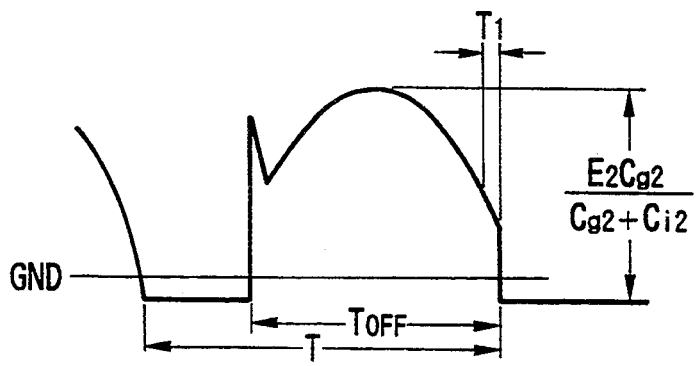
FIG. 3B is a chart showing the waveform of the gate-source voltage of a commutating FET in FIG. 4.
Figure 3C:
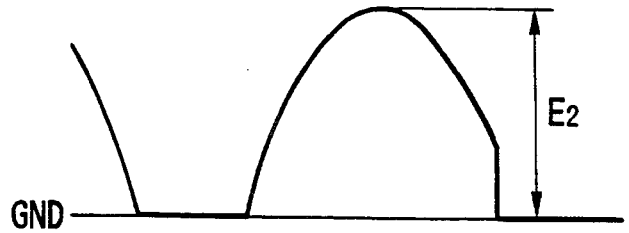
FIG. 3C is a chart showing the waveform of the gate-source voltage of a conventional commutating FET.

An operation of the circuit of the embodiment will be described next with reference to FIGS. 2A and 2B and FIGS. 3A and 3C. FIGS. 2A and 2B show the waveforms of the gate-source voltages of the rectifying FETs shown in FIGS. 1 and 5, respectively. FIGS. 3A and 3C show the waveforms of the gate-source voltages of the commutating FETs shown in FIGS. 1 and 5, respectively.

Assume that when the main switch 103 is ON, the peak value of the voltage of the secondary winding 102b of the main transformer 102 is represented by $E_1$, the capacitance of the gate capacitor 107 of the rectifying FET 104, by $C_{g1}$; the capacitance of the input capacitor 106 of the rectifying FET 4, by $C_{i1}$; and the resistance of the gate-source resistor 108 of the rectifying FET 104, by $R_1$. In this case, the waveform of the gate-source voltage of the rectifying FET 104 becomes the waveform of an AC voltage including an alternating amplitude voltage $E_1CG_1/(CG_1+C_{11})$ such as the one shown in FIG. 2A. A charge/discharge current quickly flows in the input capacitor 106 of the rectifying FET 104, and the gate-source voltage of the rectifying FET 104 rises/falls faster than that shown in FIG. 2B in the prior art. Therefore, an ON/OFF operation of the rectifying FET 104 is quickly performed. At this time, as will be described later, since the commutating FET 109 is turned off before the main switch 103 is turned on, a load current flows through a loop constituted by the secondary winding 102b of the main transformer 102, the choke coil 114, the load (not shown) of the converter, the rectifying FET 104, and the secondary winding 102b of the main transformer 102, when the rectifying FET 104 is turned on.

Referring to FIG. 2A, reference numeral 121 denotes a charge curve of a time constant $R_1(C_{g1}+C_{i1})$ in the embodiment; and 122, a discharge curve of the time constant $R_1(C_{g1}+C_{i1})$. Reference symbol $T_{ON}$ denotes an ON period of the main switch 103 in one period T. When the input capacitors 6 and 11 and the gate resistors 16 and 17 in FIG. 5 are expressed by the constants shown in FIG. 1, reference numerals 23 and 24 in FIG. 2B respectively denote a charge curve of a time constant $R_{g1}C_{i1}$ and a discharge curve of a time constant $R_{g1}C_{i1}$ in the prior art.

Assume that when the main switch 103 is OFF, the peak value of the flyback voltage of the secondary winding 102b of the main transformer 102 is represented by $E_2$; the capacitance of the gate capacitor 112 of the commutating FET 109, by $C_{g2}$; the capacitance of the input capacitor 111 of the con%mutating FET 109, by $C_{i2}$; and the resistance between the gate-source resistor 113 of the commutating FET 109, by $R_2$. In this case, the waveform of the gate-source voltage of the commutating FET 109 becomes the waveform of an AC voltage including an alternating amplitude voltage $E_2CG_2/(CG_2+C_{12})$ such as the one shown in FIG. 3A. In this case, the flyback voltage of the secondary winding 102b of the main transformer 102 quickly rises owing to a leakage inductance and the like in the main transformer 102 immediately after the main switch 103 is turned off. Subsequently, the voltage changes in the form of a sine wave. Therefore, the gate-source voltage of the commutating FET 109 rises faster than that shown in FIG. 3C in the prior art, so that the commutating FET 109 quickly turned on, and a load current flows through a loop constituted by the choke coil 114, the load (not shown) of the converter, the commutating FET 109, and the choke coil 114. Thereafter, the gate-source voltage becomes negative to turn off the commutating FET 109 before the main switch 103 is turned on.

Referring to FIG. 3A, the sine wave appears in the gate-source voltage of the commutating FET 109 because of the resonance caused by the drain-source capacitance of the FET constituting the main switch 103, connected in series with the primary winding 102a of the main transformer 102, and the inductance of the primary winding 102a. This equally applies to the gate-source voltage shown in FIG. 3C in the prior art.

As described above, according to the embodiment, the operations of the rectifying and commutating FETs 104 and 109 are almost synchronous with the operation of the main switch 103, thus minimizing degradation in efficiency caused by an operation delay, as compared with a case wherein a resistor is used as a driving element.

In addition, the gate-source voltages of the rectifying and commutating FETs 104 and 109 can be controlled by the capacitances of the gate capacitors 107 and 112. That is, the gate-source voltages can be increased to reduce the ON resistances of the FETs 104 and 109 by increasing the capacitances. In contrast to this, by decreasing the capacitances of the FETs 104 and 109 to decrease the synthetic capacitance of the input capacitors 106 and 111, the driving losses of the FETs 104 and 109 can be reduced. Therefore, the efficiency can be further improved by selecting the gate capacitors 107 and 112 having optimal capacitances which can minimize the sum of the ON resistance and driving losses of the FETs 104 and 109.

In the embodiment, the response speeds of the rectifying FET 104 and the commutating FET 109 are high, as compared even with the conventional circuit in FIG. 5 from which the gate resistors 16 and 17 are omitted. In addition, the waveforms of outputs from the FETs 104 and 109 are free from distortion. Therefore, the embodiment is optimal for practical applications.

Figure 4:
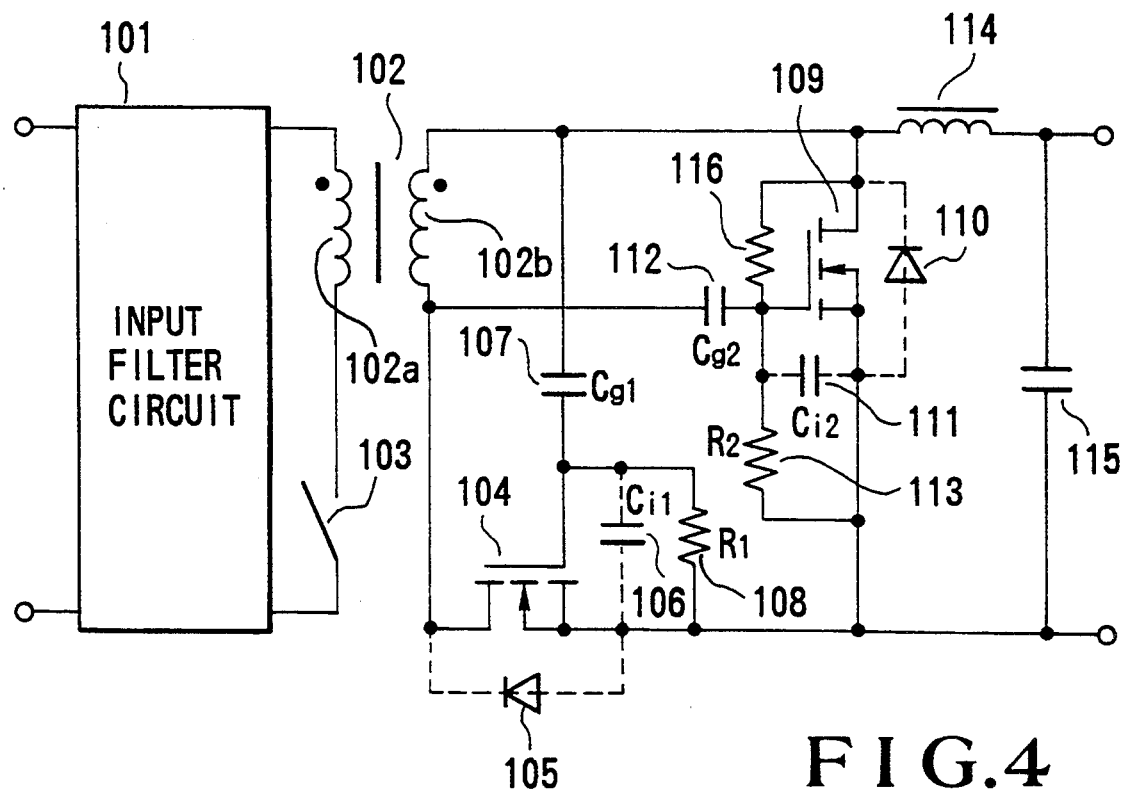
FIG. 4 is a circuit diagram of a rectifier for a DC/DC converter according to another embodiment of the present invention.

FIG. 4 shows a rectifier for a DC/DC converter according to another embodiment of the present invention. The embodiment shown in FIG. 1 is different from that shown in FIG. 1 in that a resistor 116 is connected between the drain and gate of a commutating FET 109 to DC-bias the gate. In this arrangement, a rectangular wave voltage is generated in a secondary winding 102b of a main transformer 102 when the main switch 103 is turned on, and a sine wave voltage is generated in the primary winding 102a when the main switch 103 is turned off, similar to the first embodiment. However, since the gate of the commutating FET 109 is DC-biased by a voltage, obtained by dividing, through resistors 113 and 116, a voltage generated in the secondary winding 102b of the main transformer 102 when the main switch 103 is turned on, the gate of the commutating FET 109 is driven by a DC-biased AC voltage with a sine waveform shown in FIG. 3B. As a result, an interval T1 (FIG. 3A) during which a current flows in a parasitic diode 110 of the commutating FET 109 is shortened to almost zero. Theoretically, the same phenomenon occurs when the sine wave rises. With this operation, the conduction loss of the commutating FET 109 is reduced.

As has been described above, according to the present invention, capacitors as driving elements are respectively connected between the gate of a rectifying FET and the drain of a commutating FET and between the gate of the commutating FET and the drain of the rectifying FET, and resistors are respectively connected between the gate and source of the rectifying FET and between the gate and source of the commutating FET. With this arrangement, the waveforms of the gate-source voltages of the rectifying and commutating FETs can be formed into AC voltage waveforms which quickly rise and fall. Therefore, the operations of the rectifying and commutating FETs are almost synchronous with the operation of the main switch, thus minimizing degradation in efficiency caused by an operation delay.

In addition, since the gate-source voltages of the rectifying and commutating FETs can be controlled by the capacitances of the gate capacitors, the efficiency can be further improved by selecting the gate capacitors having optimal capacitances which can minimize the sum of the ON resistance and driving losses of the FETs.

What is claimed is:

1. A rectifier for a DC/DC converter, comprising:
   a first FET connected in series with a secondary winding of a main transformer of said DC/DC converter;
   a second FET connected in parallel with a series circuit constituted by the secondary winding of said main transformer and said first FET;
   first and second capacitors respectively connected between a gate of said first FET and a drain of said second FET and between a gate of said second FET and a drain of said first FET; and
   first and second resistors respectively connected between the gate and source of said first FET and between the gate and source of said second FET.

2. A rectifier according to claim 1, wherein capacitances of said first and second capacitors are set to be values which minimize a sum of ON resistance losses and driving losses of said first and second FETs.

3. A rectifier according to claim 1, wherein a third resistor is connected between the drain and gate of said second FET to DC-bias the gate.

4. A rectifier according to claim 1, wherein said first and second FETs are MOSFETs.

* * * * *